Figure 6:
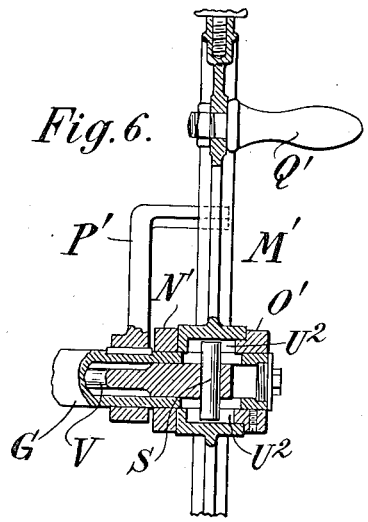

C. SACERDOTI.
CONTROLLING DEVICE FOR MOTORS.
APPLICATION FILED JAN. 7, 1911.
1,019,091.
Patented Mar. 5, 1912.
3 SHEETS—SHEET 1.
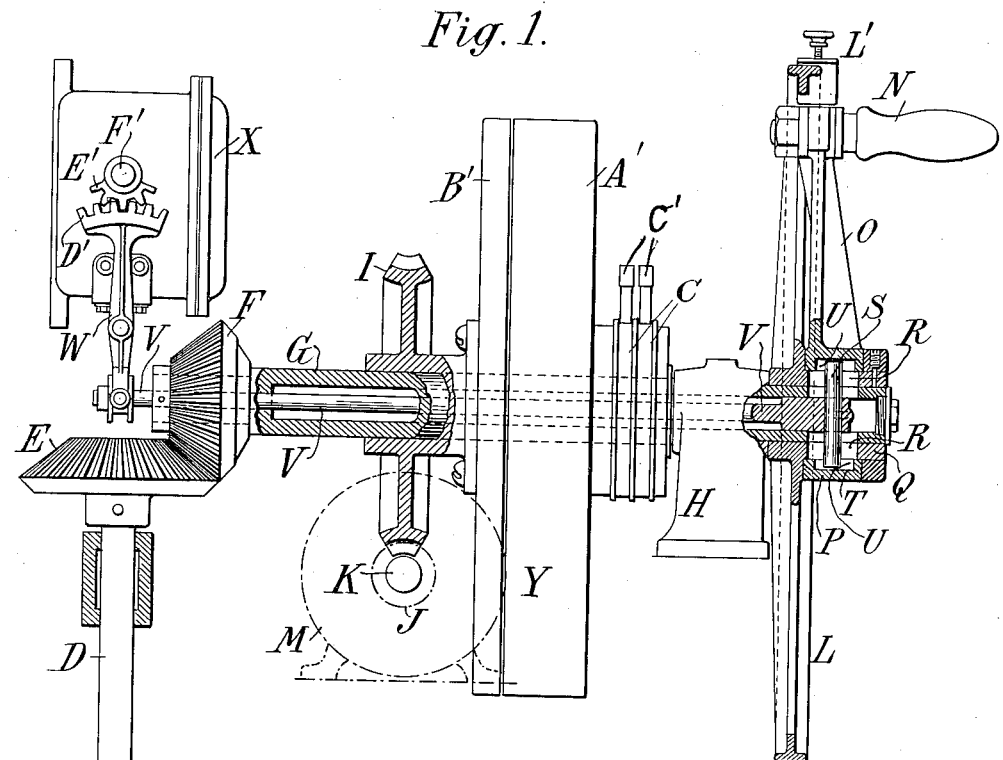
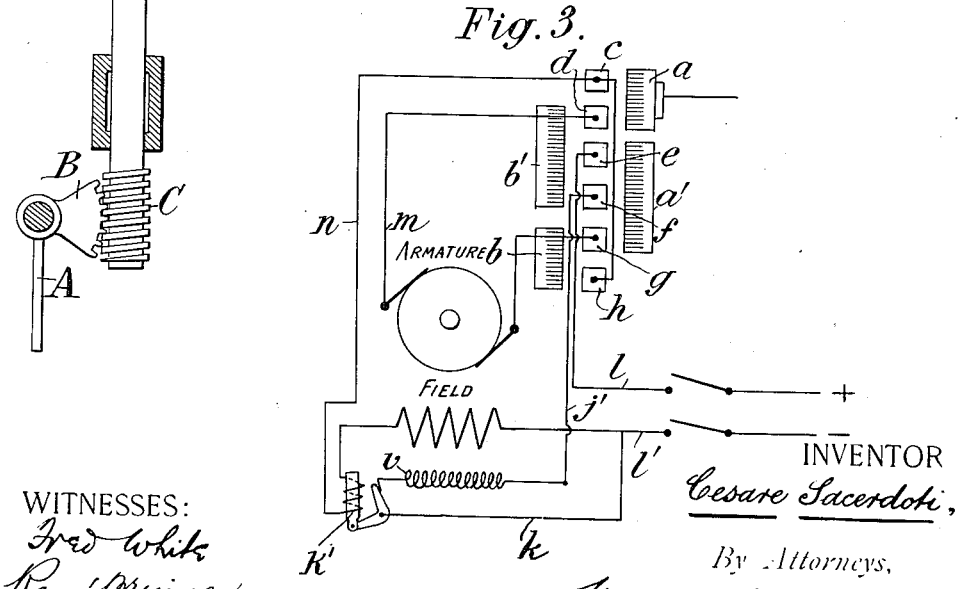
WITNESSES:
Fred White
René Breine
INVENTOR
Cesare Sacerdoti,
By Attorneys,

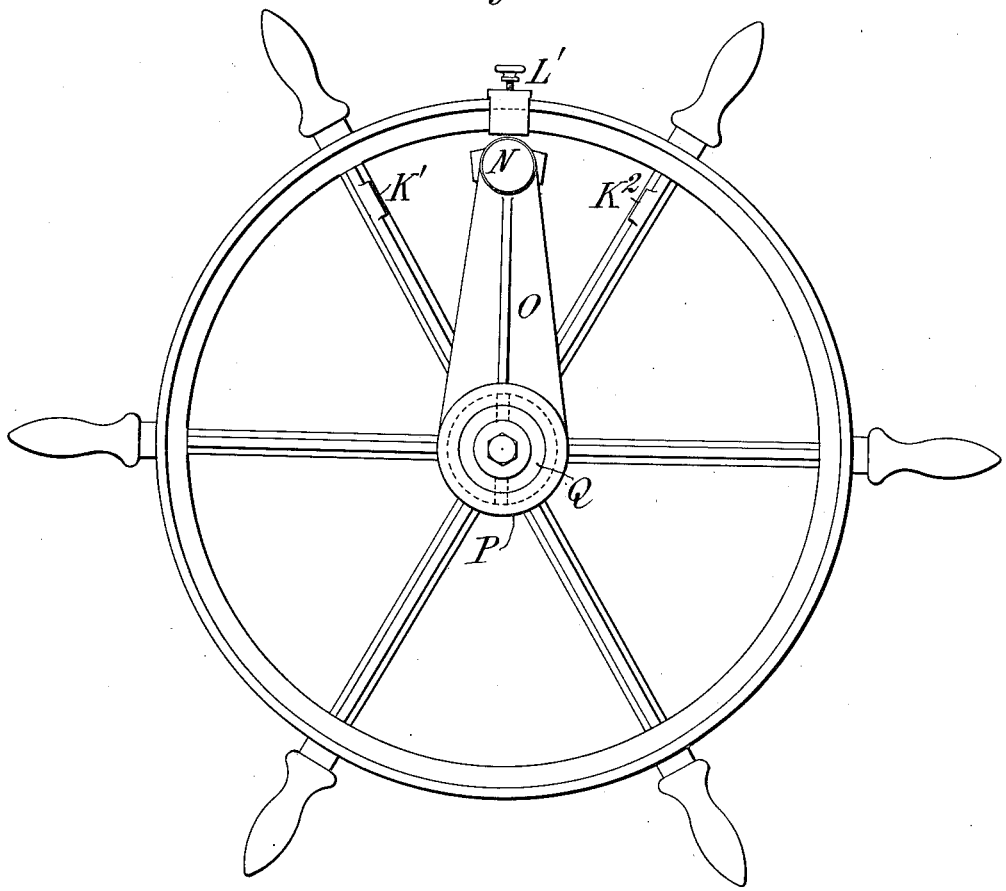
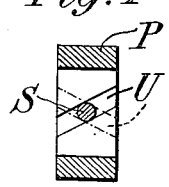
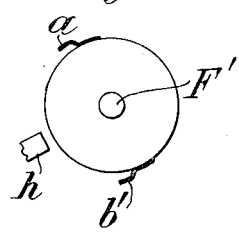

C. SACERDOTI.
CONTROLLING DEVICE FOR MOTORS.
APPLICATION FILED JAN. 7, 1911.

1,019,091.

Patented Mar. 5, 1912.
3 SHEETS—SHEET 3.

WITNESSES:
Fred White
René Bruine

INVENTOR:
Cesare Sacerdoti,
By Attorneys,
Fraser, Burk & Miller

UNITED STATES PATENT OFFICE.

CESARE SACERDOTI, OF PHILADELPHIA, PENNSYLVANIA, ASSIGNOR TO FIAT SAN GEORGIO, OF SPEZIA, ITALY, A CORPORATION OF ITALY.

CONTROLLING DEVICE FOR MOTORS.

1,019,091.  Specification of Letters Patent.  Patented Mar. 5, 1912.

Application filed January 7, 1911. Serial No. 601,254.

*To all whom it may concern:*

Be it known that I, CESARE SACERDOTI, a subject of the King of Italy, residing in Philadelphia, in the county of Philadelphia and State of Pennsylvania, have invented certain new and useful Improvements in Controlling Devices for Motors, of which the following is a specification.

This invention relates to controlling devices for motors and aims to provide certain improvements therein.

The invention is especially directed to what is known as a "follow-up" control for electric motors, although it may be utilized in connection with motors of other descriptions. Such systems are largely utilized in steering gears for vessels, training gears for guns and other cases where it is desirable to actuate the motor in a given direction only so long as a hand operated part such as a handle or wheel is kept in motion in a corresponding direction. Usually in such systems when the hand-operated part is stopped at a given point the motor or its equivalent is also stopped and the part operated by the motor is held in the position to which it has been moved. By a reverse movement of the hand-operated part the motor or its equivalent is caused to rotate in a reverse direction, thus producing a corresponding movement of the actuated part. In connection with such systems of follow-up control there is usually provided a hand-operated member by means of which the actuated part can be moved by manual power. Such supplemental hand-operated means are necessary in order that if the motor fails for any reason it is necessary or desirable to at once take up the hand control without loss of time.

My invention is particularly applicable to the control of rudders or planes of submarine boats in which there is an urgent necessity for always maintaining the boat under complete control. Should the motor fail at a critical moment, especially in emerging or submerging, a very serious danger may be incurred in the time which necessarily elapses during the substitution of the hand-operated control for the motor control. In submarine boat practice it is customary to provide for moving a lever or equivalent to throw in the hand-operated mechanism and cut out the motor. This causes a still further waste of time and has the additional disadvantage that it calls upon the operator to do very quickly an act which is necessarily dissimilar to the act of steering. As the failure of the motor is necessarily unexpected, and very often occurs at a critical period, the time necessary for the operator to become conscious of the failure of the motor and perform the necessary mental and physical acts to change the manner of control is often relatively great. According to the present invention I provide a combined motor and manual control which in its preferred form is so arranged that the change from motor control to manual control takes place in what may be called an automatic manner. Preferably the manual control is performed by a device which has the same or substantially the same field of movement as the motor control, and preferably also these fields of movement are coincident so that when the motor fails a continued movement of the motor handle will move the manual device. In the best embodiment of my invention the motor control is by means of a handle or lever, and the manual control is by means of a spoked wheel. The handle is adapted to be turned in one direction or the other thereby causing the motor to travel in the appropriate direction, and if the latter fails the continued movement of the handle or lever carries with it the manual steering wheel.

My invention also comprises certain other features of improvement which will be hereinafter more particularly described.

In the drawings I have shown illustrations of my invention as applied to a steering device for submarine or submersible boats.

Figure 7:
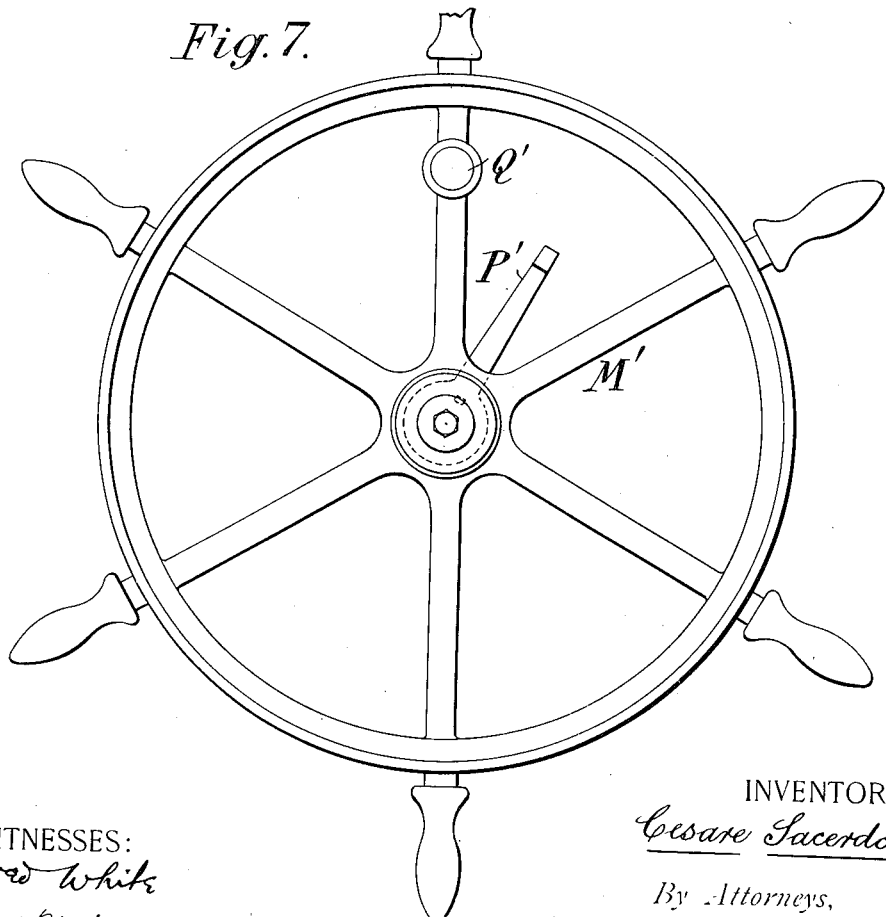

Figure 1 is a general view of the invention, showing the device partly in elevation and partly in vertical section. Fig. 2 is a front view of the operating handle and wheel. Fig. 3 is a diagrammatic view of the electrical connections. Fig. 4 is a section of the hub of the operating handle showing its cam grooves. Fig. 5 is a more or less diagrammatic view of the drum of the controller. Fig. 6 is a sectional view of a simplified form. Fig. 7 is a front view of Fig. 6.

Referring to the drawings, let A indicate a rudder, for instance, which it is desired to control by the present system. Ordinarily there will be applied to the rudder shaft a sector B which is engaged and designed to be turned by a worm C mounted on a shaft D. The shaft D is provided at its inner end with a bevel gear E which in turn meshes with a similar gear F mounted at the end of a hollow shaft G. The shaft G is journaled in any suitable bearing such as H and has loosely mounted upon it a worm wheel I adapted to be turned by a worm J carried upon the motor shaft K. At the outer end of the shaft G is keyed a hand-operating device such as a steering wheel L. It is obvious from this construction that as the worm wheel I is not fixed to the shaft G the latter may be turned by hand by means of the steering wheel L to move the rudder shaft A in either direction.

In the present embodiment of the invention the device as thus far described constitutes manually operable means for controlling the position of the rudder, and such means are capable of operation either when the motor-operated means, which will now be described, accidentally fail or are intentionally cut out of action by the operator.

In the construction illustrated the motor control is operated by means of a handle N fixed upon an arm O, the hub P of which encircles the hub Q of the wheel L. The hub Q is provided with two longitudinal slots R on opposite sides thereof, while the hub P of the handle E is formed on its inner face with two opposite cam slots U. Extending through the slots R and U is a pin S which engages at its middle a shaft V which extends through the hollow shaft G to a point beyond the bevel pinion F and is there connected with an arm or lever W of a controller X by a suitable yoke connection permitting the rotation of the shaft V. The result of this construction is that when the handle N is rotated relatively to the wheel L, its cam slots U force the pins S either forward or backward, thus causing a relative forward or backward movement of the shaft V. On the other hand, when the wheel and handle are turned coincidently there is no such relative movement and the shaft V maintains its longitudinal position.

The controller X may be any device which is capable of controlling the forward and backward movements of the motor employed. In the case of an electric motor, such as is illustrated, a movement of the controller arm W from the central position indicated in Fig. 1 will so control the necessary circuits that the motor will run forward when the arm W is moved in one direction and backward when it is moved in the reverse direction. In order that the shaft G may be entirely disconnected from the motor when the electric current fails, or for some other reason the motor refuses to act, I provide a magnetic clutch Y on the shaft G, one member of which A' is fixed to the shaft and the other member of which B' is fixed to the hub of the worm wheel I, and hence rotates freely upon the shaft G. Current is supplied to the clutch by brushes C' acting against rings C and energizes suitable electric magnets (which are not shown) to attract the member B' to the member A' and thus couple the shaft G with the motor. When the current fails, the clutch is automatically disconnected, thus leaving the shaft free to rotate without reference to the motor. This construction is especially desirable in cases wherein the motor is geared to the shaft through a worm wheel connection which does not permit the shaft to rotate the motor when the shaft is turned by hand. In place of such connection a level wheel or other gearing connection could be substituted, wherein the parts do not lock as in the case of the worm wheel connection shown.

In the construction shown the arm W is provided with a sector D' which meshes with a similar sector E' mounted upon a rocking arm F' which is adapted to control the electrical circuit. In Fig. 3 I have illustrated diagrammatically one form of electrical connection which will accomplish the desired result. In this figure $a$ $a'$ indicate one set of brushes or contacts and $b$ $b'$ another set of brushes or contacts which are designed to be brought alternately into engagement with fixed contacts $c$ $d$, etc. The contacts $a$ $a'$ and $b$ $b'$ are preferably mounted upon a drum which is in turn mounted on the shaft F' of the controller as shown in Fig. 5. Assuming the drum is rotated in one direction by the shaft V acting through arm W and sectors D' and E' so that the contacts $a$ $a'$ are brought into operative relation, then a current will flow through wire $l$ to contact $e$ to brush $a'$ and thence through contact $f$ and wire $j$ to the magnetic clutch V, thereby energizing the latter, and thence through wire $k$ to wire $l'$. A current will also flow through contact $g$ to the armature of the motor, thence by wire $m$ to contact $d$, thence through brush $a$ to contact $c$ and thence by wire $n$ to the field of the motor. Under these circumstances the motor will revolve in a given direction. To reverse the motor the shaft V is shifted in an opposite direction by the handle N, thereby moving the rock shaft F' through the intermediate connections in an opposite direction to bring the brushes $b$ $b'$ in engagement with the contacts $c$ $d$, etc. Under these circumstances the current will flow in an opposite direction through the motor armature.

In the operation of my invention when the steering is to be done by the motor, as is normally the case, the handle N is moved let us say to the right, thereby shifting the shaft V in a rearward direction. During the first part of this movement the wheel L remains stationary since the power required to move the shaft V is slight in comparison with the power required to move the rudder. As soon as the handle N has been shifted far enough to bring one set of brushes of the controller into engagement with the contacts, the circuit through the magnetic clutch and motor is completed. The first effect of this is to couple the worm wheel I to the shaft G, and the next effect is to rotate the motor in the appropriate direction; let us assume this to be in such direction as will cause the rudder to emerge the boat. If the handle N were now held stationary, the rotation of the shaft G forwardly would cause the pins S to move to their neutral positions along the inclined slots in the hub P. In so doing the shaft V would be retracted to its neutral position and the motor would stop. When it is desired to move the rudder in the opposite direction the handle is turned backwardly toward its neutral position and in so doing the inclined slots in the hub force the pins in the opposite direction, thereby moving the shaft V rearwardly, and thus disengaging the brushes $a\ a'$ and engaging the brushes $b\ b'$ with the stationary contact $c\ d$, etc. The motor will now reverse in direction and will continue to run as long as the handle is moved backwardly. When a point is reached where it is desired to stop the rudder, the handle is stopped, and the parts automatically disengage themselves, as before. During the movements of the handle the wheel L of course moves coincidently with it due to its fixed connection to the shaft G.

Let us assume that there is now a failure of the electric circuit. The first effect of this is the release of the magnetic clutch, and a failure of the shaft G to turn. When the operator sees that the shaft and hand wheel are not turning and, therefore, that the motor is not working, he merely continues the movement of the handle in the intended direction. This will be without effect until the handle contacts with a stop $K'$ or $K^2$ on the wheel L. The handle then becomes in effect a part of the steering wheel and by a further movement in the required direction the steering wheel is moved through the medium of the handle. It will thus be seen that the operator has to perform but one movement in any direction, since the parts automatically change from a motor-control system to a manually-controlled system. This requires no thought or effort on the part of the operator and the system is immediate in its action. Of course, as soon as the operator realizes that the motor control has failed, he will if required use two hands to operate the steering wheel. If this is done, the handle N may be entirely neglected, since the steering wheel L is fixed to the shaft G. It will be noted that while there is a slight lost motion in the initial operation of the steering wheel by the handle N, this lost motion can be reduced so that it is negligible, by giving the handle only range enough between the stops $K'$ and $K^2$ to bring the contacts of the brushes of the controller properly into and out of engagement with the fixed contacts of the controller. If it is desired to do so, the handle N may be fixed in its neutral position by a spring clutch or the like $L'$ mounted upon the wheel L. The stops $K'$ $K^2$ may also serve the purpose of limiting the relative movement of the handle N and wheel L in order to limit the forward and rearward movements of the shaft V to the amount necessary for operating the controller.

In Figs. 6 and 7 I have shown my invention as applied to a construction in which the motor handle is as a separate element omitted. In this case the hand wheel $N'$ is mounted loosely upon the shaft between two collars $N'\ O'$ which prevent the longitudinal movement of the wheel upon the shaft. A stop $P'$ is provided which is shown as extending between two of the spokes of the wheel $M'$. This stop is fixed to the shaft G and permits a limited movement of the wheel in either direction without moving the shaft. As soon as one of the spokes of the wheel contacts with the stop, the shaft and wheel are connected and the movement of the wheel thence moves the shaft. The slight relative movement of the wheel and shaft which is permitted by this construction is utilized to move the motor controlling shaft V in the same manner as in Figs. 1 to 5, that is to say, the interior of the hub of the wheel is provided with inclined slots $U^2$ which are adapted to exert a cam action upon the pin S to move the same either forward or backward. In this construction the wheel itself constitutes the motor controlling member and also the hand controlling member. So long as the motor is working the wheel moves with little effort on the part of the operator. If the motor fails a movement of the wheel continued in the required direction will rotate the shaft by hand. To facilitate the movement under motor control, a supplemental handle $Q'$ may be fixed to one of the spokes of the wheel $M'$.

It is obvious that in the construction shown in Figs. 1 to 5 the hand wheel may be omitted and stops provided such as the stops $K'\ K^2$ by which the motor controlling handle N may become the sole means for manually operating the shaft.

If it is desired to do so the electrical circuit for operating the magnetic clutch may be controlled by a switch which is in turn controlled by an electro-magnet in series with the motor field or motor armature, or both, so that when a burn-out or other accident happens to the field or armature the switch controlling the magnetic clutch circuit will be opened, thus breaking the circuit, such a device is indicated diagrammatically at *k'* Fig. 3. Any other electrical means for accomplishing this result may be employed.

It will be observed that the present invention while especially applicable to submarine steering gear control is also adapted for all systems wherein a follow-up motor control is used. In the case of submarine boats, however, the element of danger introduced by the necessity of a separate manual act on the part of the operator in changing from one system to the other makes the present system of peculiar value and importance.

While I have shown in detail several embodiments of the invention, it is to be noted that I do not wish to be limited thereto as a wide range of modifications may be employed without departing from the spirit of the invention.

By way of example, without intending to limit my invention, I would point out that it is not necessary to utilize an electric motor since a motor driven by steam or other power may be used. Nor is it essential to utilize the same mechanism herein set forth or mechanism similar thereto. Any other suitable mechanism may be employed by which the hand control may be taken up by a practically continuous movement. It is preferable that the movement be in the same direction as that of the motor controlling part, but the principal object to be gained by the present invention is the avoidance of the necessity of a distinct act on the part of the operator when the motor control fails.

What I claim is:—

1. In a follow-up control mechanism, the combination of a motor controlling mechanism, and a manually operable means, and means for automatically throwing said manual means into operation when the motor controlling mechanism fails.

2. In a follow-up control mechanism, the combination of a motor controlling mechanism, and a manually operable means, said motor controlling means acting automatically to opearte said manual means when said motor fails.

3. In a follow-up control mechanism, the combination of a motor controlling mechanism, and a manually operable means, said mechanism and means being movable in the same direction, and means for operatively connecting the two automatically when the motor fails.

4. The combination of a part to be moved, a motor for moving it, means for controlling said motor, means for moving said part by hand, and means for automatically throwing said hand operable part into operation when said motor fails.

5. The combination with a part to be moved, of a manually operable device for moving it, a motor also adapted to move said part, and means for controlling said motor, said manually operable device and said motor controlling means being adapted to move in the same general direction and said motor controlling means being adapted to mechanically engage and move said manually operable device.

6. The combination with a part to be moved, of a manually operable device for moving it, a motor also adapted to move said part, and means for controlling said motor, said manually operable device and said motor controlling means being adapted to move around the same axis and said motor controlling means being adapted to mechanically engage and move said manually operable device.

7. The combination with a part to be moved, of a manually operable device for moving it, a motor also adapted to move said part, and means for controlling said motor, said manually operable device and said motor controlling means being adapted to be moved around the same axis and being mounted adjacent to each other, said motor controlling means being adapted to mechanically engage and move said manually operable device.

8. The combination of a part to be moved, a manually operable wheel for moving it, a motor also adapted to move said part, and a handle for controlling said motor, said handle and wheel being mounted to turn about the same axis, and one being adapted to mechanically engage and turn the other.

9. The combination of a part to be moved, a manually operable wheel for moving it, a motor also adapted to move said part, and a handle for controlling said motor, said handle and wheel being mounted to turn about the same axis, and said handle being adapted by a movement of the handle alone to be brought into engagement with said wheel, and to move the same.

10. The combination of a part to be moved, a manually operable member for moving it, a motor also adapted to move said part, means whereby said manually operable member is also moved by said motor, a handle for controlling said motor, said motor being adapted to run while said handle is moved, and said handle and manually operable member being adapted to move at substantially the same speed and one of said parts (handle and manually operable member) being adapted to mechanically engage and move the other.

11. The combination of a part to be moved, a manually operable member for moving it, a motor also adapted to move said part, and a handle for controlling said motor, said handle being adapted to operate said motor by an initial movement relative to said manually operable member, and to move said manually operable member by a further movement of the handle.

12. The combination with a part to be moved of a manually operable member for moving it, a motor also adapted to move said part, and a handle for controlling said motor, said handle being adapted to automatically engage said manually operable member and move the same when the motor fails.

13. The combination of a shaft, a motor for moving it, a handle for controlling said motor, and means for automatically connecting said handle with said shaft to turn the shaft when said motor fails.

14. The combination of a shaft, a hand wheel fixed to said shaft, a handle adapted to rotate relatively to said hand wheel, a motor adapted to move said shaft, and a mechanical device for causing said motor to move in reverse directions, said device being actuated in one direction by a movement of said handle and in the opposite direction by a similar movement of said hand wheel.

15. The combination of a shaft, a hand wheel fixed to said shaft, a handle adapted to rotate relatively to said hand wheel, a motor adapted to move said shaft, means for moving said motor in reverse directions respectively by movements of said handle and hand wheel in the same direction, and means for automatically connecting said handle and hand wheel when said motor fails.

16. The combination of a shaft, a motor for driving said shaft, a hand wheel fixed to said shaft, a handle mounted to turn relatively to said hand wheel and arranged concentrically therewith, a part in mechanical engagement with said hand wheel and said handle and moved in opposite directions respectively by relative movements of said hand wheel and handle in one direction, and a controller actuated by said part to cause the motor to move in reverse directions.

17. In a submarine or submersible boat, the combination of a rudder, a motor for moving said rudder, a handle for controlling said motor, a manually operable part also adapted to move said rudder, and means for automatically connecting said motor controlling handle with said manually operable part when the motor fails.

18. In a submarine or submersible boat, the combination of a rudder, a motor for moving said rudder, a shaft driven by said motor, a hand wheel fixed to said shaft, a handle mounted concentrically with said hand wheel, and a mechanical device in engagement with said hand wheel and handle and operated by relative movement between said hand wheel and handle to control said motor.

19. In a submarine or submersible boat, the combination of a rudder, a motor for moving said rudder, a shaft driven by said motor, a hand wheel fixed to said shaft, a handle mounted concentrically with said hand wheel, means operated by relative movement between said hand wheel and handle to control said motor, and means for automatically connecting said handle and hand wheel when said motor fails.

20. In a submarine or submersible boat, the combination of a rudder, a motor for moving said rudder, a hollow shaft adapted to be moved by said motor, a hand wheel fixed to said shaft, a handle adapted to turn about the same axis as said hand wheel, a part having a cam actuated by said handle, a shaft within said hollow shaft moved by said cam, a controller operated by said second shaft, and means operated by said controller for driving said motor in reverse directions.

21. In a follow-up control mechanism, the combination of a part to be moved, a motor for moving said part, a motor-controlling mechanism, a manually operable means, and means for throwing said manual means into operation when the motor-controlling mechanism fails, said motor being connected to said part to be moved through a magnetic clutch which is operative only when the circuit of the motor is closed.

22. The combination of a shaft, a motor, a gear connection between said shaft and motor adapted to permit the motor to drive the shaft and to prevent the shaft from driving the motor, a magnetic clutch adapted to couple said connection to the shaft only when the motor is in operation, a manually operable member for moving said shaft, a member for controlling said motor to operate said shaft, and means for automatically connecting said controlling member with said manually operable member when the motor fails.

23. In a follow-up control mechanism, the combination of a part to be moved, a motor for moving it, and a hand controlling means acting automatically to operate said part by hand when the motor control fails.

In witness whereof, I have hereunto signed my name in the presence of two subscribing witnesses.

CESARE SACERDOTI.

Witnesses:
 EUGENE V. MEYERS,
 THOMAS F. WALLACE.